US009263715B2

(12) United States Patent
Hamano et al.

(10) Patent No.: US 9,263,715 B2
(45) Date of Patent: Feb. 16, 2016

(54) BATTERY PACK, ELECTRIC TOOL AND BATTERY CHARGER

(75) Inventors: Terufumi Hamano, Tokyo (JP); Akira Teranishi, Tokyo (JP); Hajime Takemura, Tokyo (JP); Keisuke Koitabashi, Tokyo (JP)

(73) Assignee: MAX CO., LTD., Tokyo (JP)

( * ) Notice: Subject to any disclaimer, the term of this patent is extended or adjusted under 35 U.S.C. 154(b) by 974 days.

(21) Appl. No.: 13/442,955

(22) Filed: Apr. 10, 2012

(65) Prior Publication Data

US 2012/0256590 A1    Oct. 11, 2012

(30) Foreign Application Priority Data

Apr. 11, 2011    (JP) .................................. 2011-087087

(51) Int. Cl.
  *H01M 2/10*    (2006.01)
  *H02J 7/00*    (2006.01)
  *B25J 5/00*    (2006.01)

(52) U.S. Cl.
  CPC ............... *H01M 2/1022* (2013.01); *B25J 5/00* (2013.01); *H01M 2/1055* (2013.01); *H02J 7/0045* (2013.01)

(58) Field of Classification Search
  None
  See application file for complete search history.

(56) References Cited

U.S. PATENT DOCUMENTS

| 3,952,239 | A | * | 4/1976 | Owings et al. ................ 320/113 |
| 2005/0130034 | A1 | * | 6/2005 | Buck et al. .................... 429/160 |
| 2007/0224492 | A1 | * | 9/2007 | Scott et al. ..................... 429/99 |
| 2009/0011325 | A1 | * | 1/2009 | Agehara et al. ................ 429/98 |
| 2010/0000067 | A1 | * | 1/2010 | Turner et al. .................... 29/428 |

FOREIGN PATENT DOCUMENTS

| CN | 101375433 A | 2/2009 |
| EP | 1 973 181 A1 | 9/2008 |
| EP | 2 421 071 A1 | 2/2012 |
| JP | 2001-155700 | 6/2001 |
| JP | 2008-103144 | 5/2008 |
| WO | WO 2008/047765 A1 | 4/2008 |

* cited by examiner

*Primary Examiner* — Patrick Ryan
*Assistant Examiner* — Jose Colucci Rios
(74) *Attorney, Agent, or Firm* — Drinker Biddle & Reath LLP

(57) ABSTRACT

A battery pack includes a casing having an opening, an engaging member having a stopper, and a regulating member configured to regulate a movement of the engaging member. The engaging member is supported in a slidable and rotatable manner relative to the casing, and is applied with a biasing force such that the stopper projects from the opening. The regulating member includes a contact portion configured to block a rotation of the engaging member and an operating portion configured to displace the contact portion to release a blocking of the rotation of the engaging member. When the operating portion is a non-operated state, the engaging member is slidable against the biasing force to retract the stopper. When the operating portion is in an operated state, the engaging member is rotatable against the biasing force to retract the stopper.

6 Claims, 17 Drawing Sheets

BATTERY PACK, ELECTRIC TOOL AND BATTERY CHARGER

CROSS-REFERENCE TO RELATED APPLICATION(S)

The present application claims the benefit of priority of Japanese Patent Application No. 2011-087087, filed on Apr. 11, 2011, the disclosure of which is incorporated herein by reference.

TECHNICAL FIELD

The present invention relates to a battery pack to be detachably attached as a power source to equipments such as an electric tool or a battery charger.

BACKGROUND

A related art battery pack is configured such that it is detachably attached to a grip portion of an electric tool or to a battery charger, and when the battery pack is attached to the equipment, positive and negative terminals of the battery pack are contact the terminals of the equipment.

JP 2008-103144 A discloses a structure for sliding a battery pack relative to a mounting portion of an electric tool to attached the battery pack to the electric tool. The battery pack includes an engaging hook configured to engage with the mounting portion of the electric tool to attach the battery pack to the mounting portion.

The battery pack includes engagement releasing buttons on respective sides thereof. To detach the battery pack, the engagement releasing buttons are pushed into the battery pack to move the engagement hook in an engagement releasing direction. Each of the engagement releasing buttons has an inclined inner face contacting a receiving portion of the engaging hook. When the engagement releasing buttons are pushed in, the receiving portion of the engaging hook slides on the inner faces of the engagement releasing buttons so that the engaging hook is moved in the engagement releasing direction.

However, in a work site, dust enters the inside of the battery pack, and the dust may adhere to the sliding faces of the engagement releasing buttons and the engaging hook. When the engagement releasing operations are carried out with the dust adhered to the sliding faces, the sliding faces are roughened due to the interposed dust, resulting in an increase in frictional resistance and deterioration of operability. In the worst case, the engagement releasing operation cannot be carried out.

SUMMARY

Illustrative aspects of the present invention provide a battery pack mounting structure and addresses the problem of roughening of sliding faces and the resulting increase in frictional resistance.

According to an illustrative aspect of the present invention, a battery pack is provided. The battery pack includes a casing having an opening, an engaging member having a stopper, and a regulating member configured to regulate a movement of the engaging member. The engaging member is supported in a slidable and rotatable manner relative to the casing, and is applied with a biasing force such that the stopper projects from the opening. The regulating member includes a contact portion configured to block a rotation of the engaging member and an operating portion configured to displace the contact portion to release a blocking of the rotation of the engaging member. When the operating portion is a non-operated state, the engaging member is slidable against the biasing force to retract the stopper. When the operating portion is in an operated state, the engaging member is rotatable against the biasing force to retract the stopper.

According to another illustrative aspect of the present invention, an electric tool is provided. The electric tool is configured such that the battery pack described above detachably attached. The electric tool includes a mounting portion to which the battery pack is attached in a slidable manner. The mounting portion includes an engaging portion with which the stopper engages when the battery pack is attached to the mounting portion. The mounting portion is configured such that, when the battery pack slides in an attaching direction relative to the mounting portion, the mounting portion presses the stopper to slide the engaging member and to retract the stopper. The engaging portion is configured such that, when the operating portion is operated and the battery pack slides in a detaching direction relative to the mounting portion, the engaging portion presses the stopper to rotate the engaging member and to retract the stopper.

According to another illustrative aspect of the present invention, a battery charger is provided. The battery charger is configured such that the battery pack described above detachably attached. The battery charger includes a mounting portion to which the battery pack is attached in a slidable manner. The mounting portion includes an engaging portion with which the stopper engages when the battery pack is attached to the mounting portion. The mounting portion is configured such that, when the battery pack slides in an attaching direction relative to the mounting portion, the mounting portion presses the stopper to slide the engaging member and to retract the stopper. The engaging portion is configured such that, when the operating portion is operated and the battery pack slides in a detaching direction relative to the mounting portion, the engaging portion presses the stopper to rotate the engaging member and to retract the stopper.

Other aspects and advantages of the present invention will be apparent from the following description, the drawings, and the claims.

DETAILED DESCRIPTION

Hereinafter, an exemplary embodiment of the present invention will be described in detail with reference to the drawings.

Figure 6A:
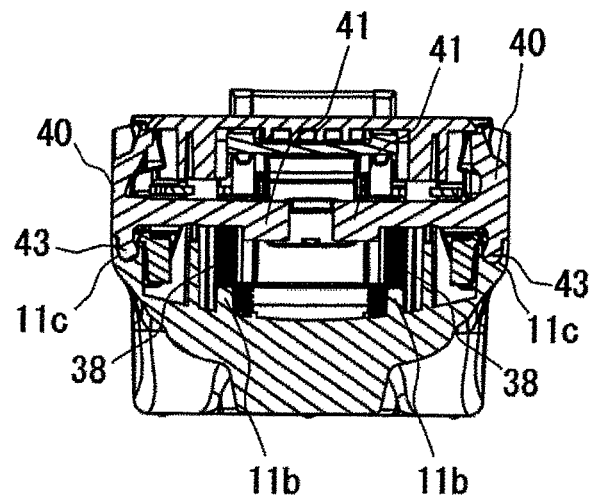
FIG. 6A is a sectional view of the battery pack taken along the line A-A shown in FIG. 5.

In the following description, an upward direction is a direction in which a mounting surface of a battery pack 10 faces, and a downward direction is a direction opposite to the upward direction. A forward direction is a direction in which the battery pack 10 slides in an attaching direction D1 (see FIG. 12A), and a rearward direction is a direction opposite to the forward direction. Right and left directions are right and left directions when viewed in the forward direction. For example, the upward and downward directions correspond to upward and downward directions in FIGS. 6A to 6C, the right and left directions correspond to the right and left directions in FIG. 6A, the forward direction corresponds to a right direction in FIG. 6B, and the rearward direction corresponds to a left direction in FIG. 6B.

Figure 1:
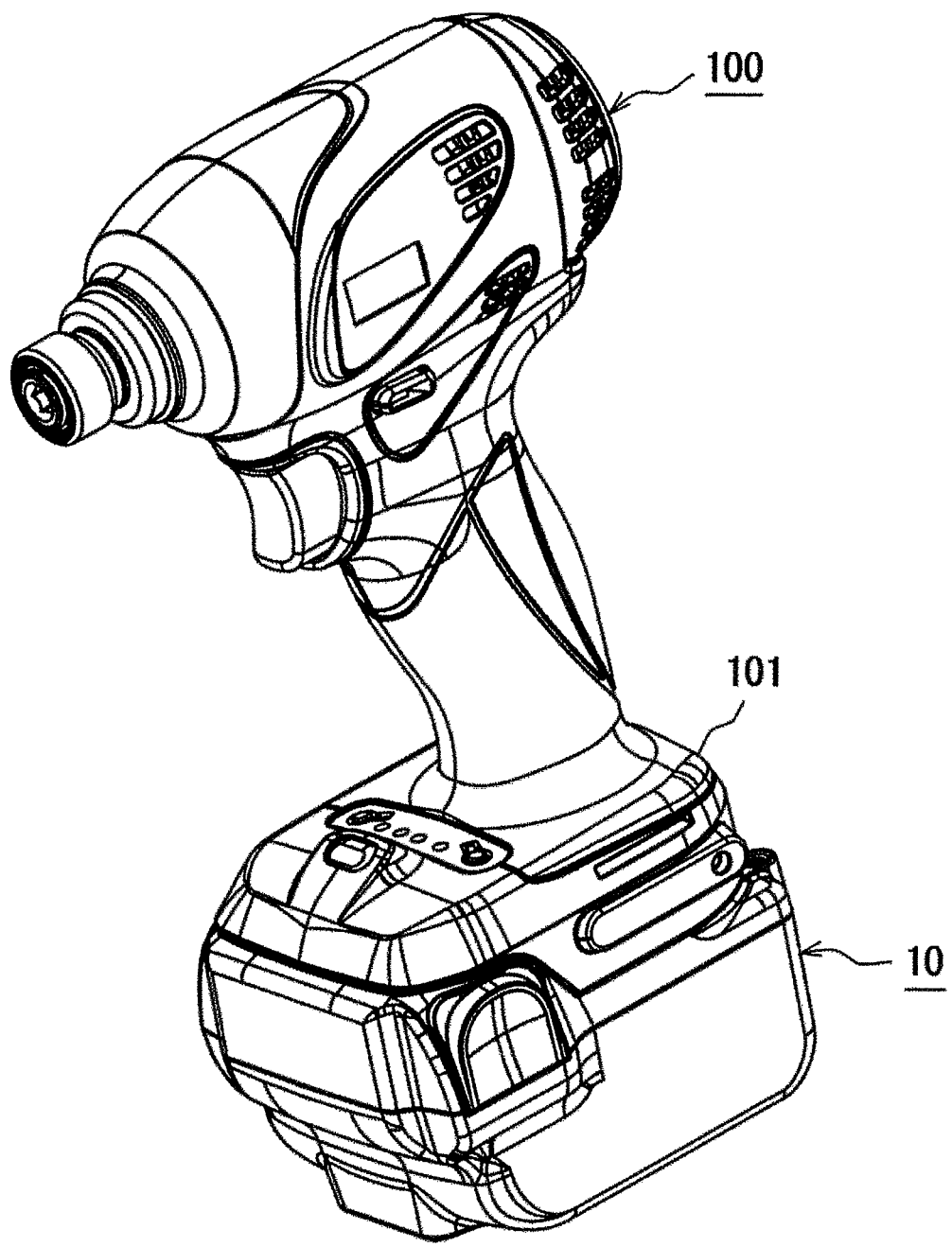
FIG. 1 is a perspective view of an electric tool on which a battery pack is mounted.

FIG. 1 shows an electric tool 100 and a battery pack 10 according to an exemplary embodiment of the present invention. The electric tool 100 is an electric rotary tool. The electric tool 100 and the battery pack 10 are configured such that they can be detachably attached to each other. That is, the lower end portion of the grip of the electric tool 100 includes a mounting portion 101 for mounting the battery pack 10 such that the lower end face of the grip and the upper end face of the battery pack 10 contacts each other.

Figure 2:
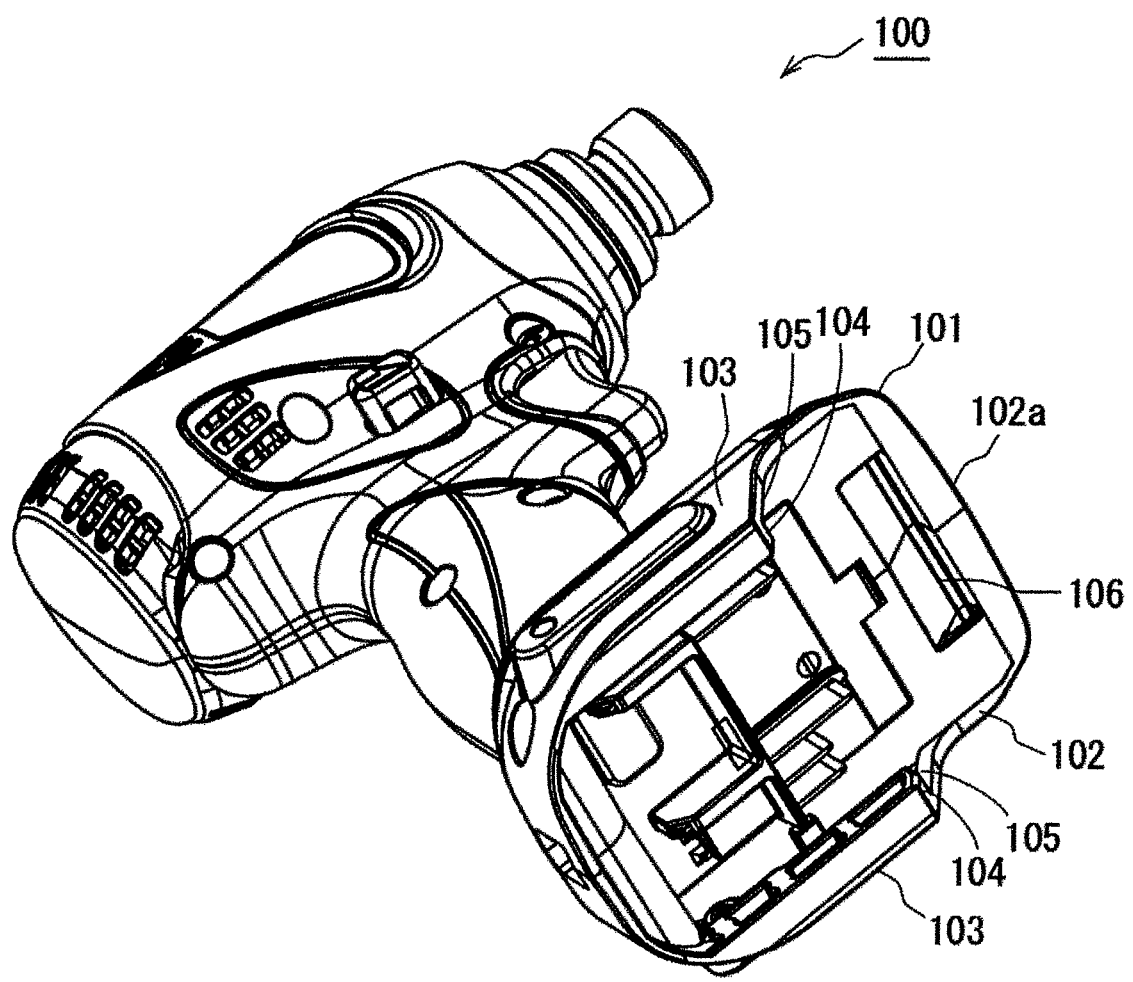
FIG. 2 is a perspective view of the mounting portion of the electric tool.

As shown in FIG. 2, the mounting portion 101 of the electric tool 100 includes a bottom base 102 provided on the lower end portion of the grip, and downwardly extending lateral portions 103 formed on respective sides of the bottom base 102.

The bottom base 102 is configured such that the upper surface of the battery pack 10 slides along the lower surface of the electric tool 100. In a portion of the bottom surface of the bottom base 102 near the distal side 102a of the bottom base 102, an engaging portion 106 is provided in a recessed manner to lock the battery pack 10. The engaging portion 106 is a recessed portion having a V-shaped cross section, and has an inclined face and a substantially vertical face formed between the inclined face and the distal side 102a of the bottom base 102.

The downwardly extending lateral portions 103 extend downward from the right and left sides of the bottom base 102 and, when the battery pack 10 is mounted, contact the upper side portions of the battery pack 10 on the outer side of the battery pack 10. The lower end of each of downwardly extending lateral portions 103 includes a guide rib 104. The guide rib 104 protrudes inward, and forms a slide groove 105 above the guide rib 104. The guide ribs 104 and the slide grooves 105 slidably engages with guide rails 21 and grooves 22 on the upper side portions of the battery pack 10.

Figure 3A:
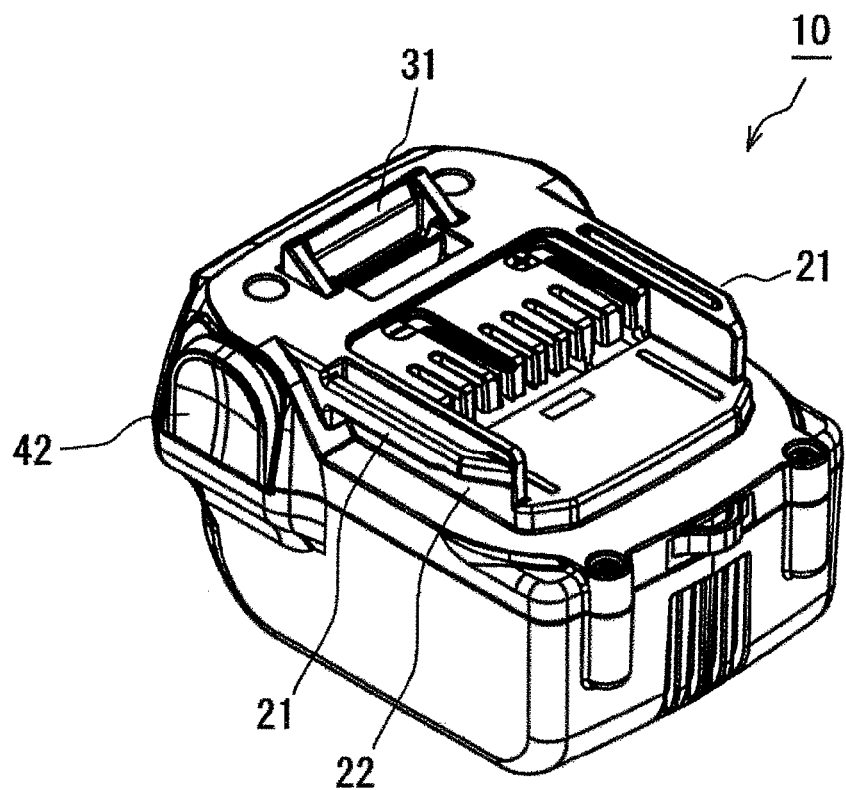
FIG. 3A is a perspective view of the battery pack.
Figure 3B:
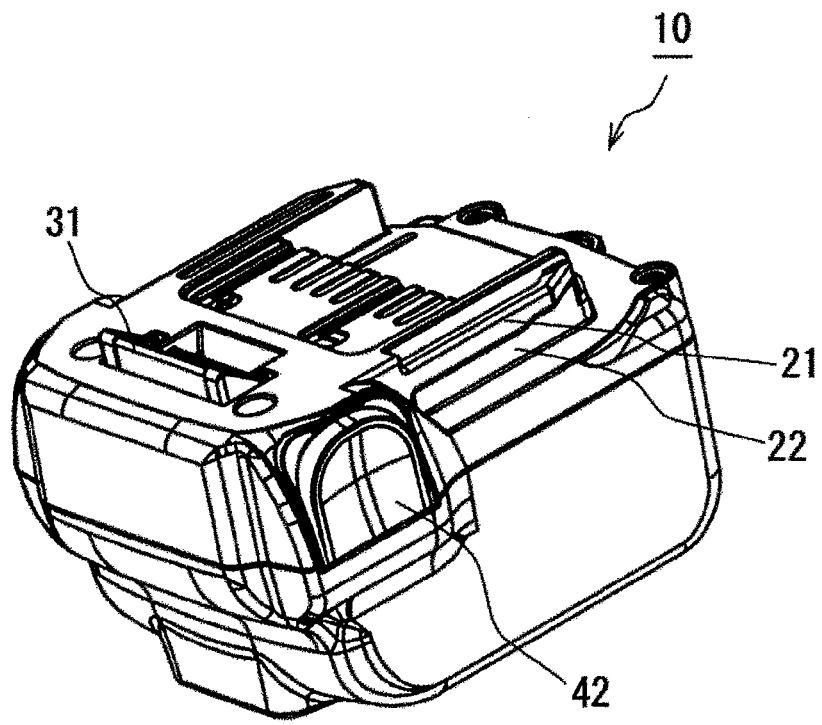
FIG. 3B is another perspective view of the battery pack.

As shown in FIGS. 3A and 3B, the guide rails 21 and the grooves 22 of the battery pack 10 are formed on respective sides on the surface of the battery pack 10. By providing the guide rails 21 and the grooves 22, the battery pack 10 can be detachable attached to the mounting portion 101 of the electric tool 100 in a sliding manner. That is, the guide rails 21 protrude outward, and form the grooves 22 below the respective guide rails 21. When the guide ribs 104 are inserted from the open end sides of the grooves 22, the battery pack 10 can slide with the guide ribs 104 and the slide grooves 105 being engaged with the guide rails 21 and the grooves 22.

The battery pack 10 includes a stopper 31 which engages with the engaging portion 106. The stopper 31 is biased in a direction in which the stopper 31 projects from the upper surface of the battery pack 10. The stopper 31 is provided to project and retract with respect to the upper surface of the battery pack 10 in a direction perpendicular to the direction in which the guide rails 21 and the grooves 22 extend. When the battery pack 10 slides up to a given position, the stopper 31 fits into the engaging portion 106, thereby firmly fixing the battery pack 10 to the mounting portion 101.

To detach the battery pack 10 from the mounting portion 101, a latch operating portion 42 is pushed into the battery pack 10. Specifically, two latch operating portions 42 are provided on respective sides of the battery pack 10 in an opposed manner.

Figure 4:
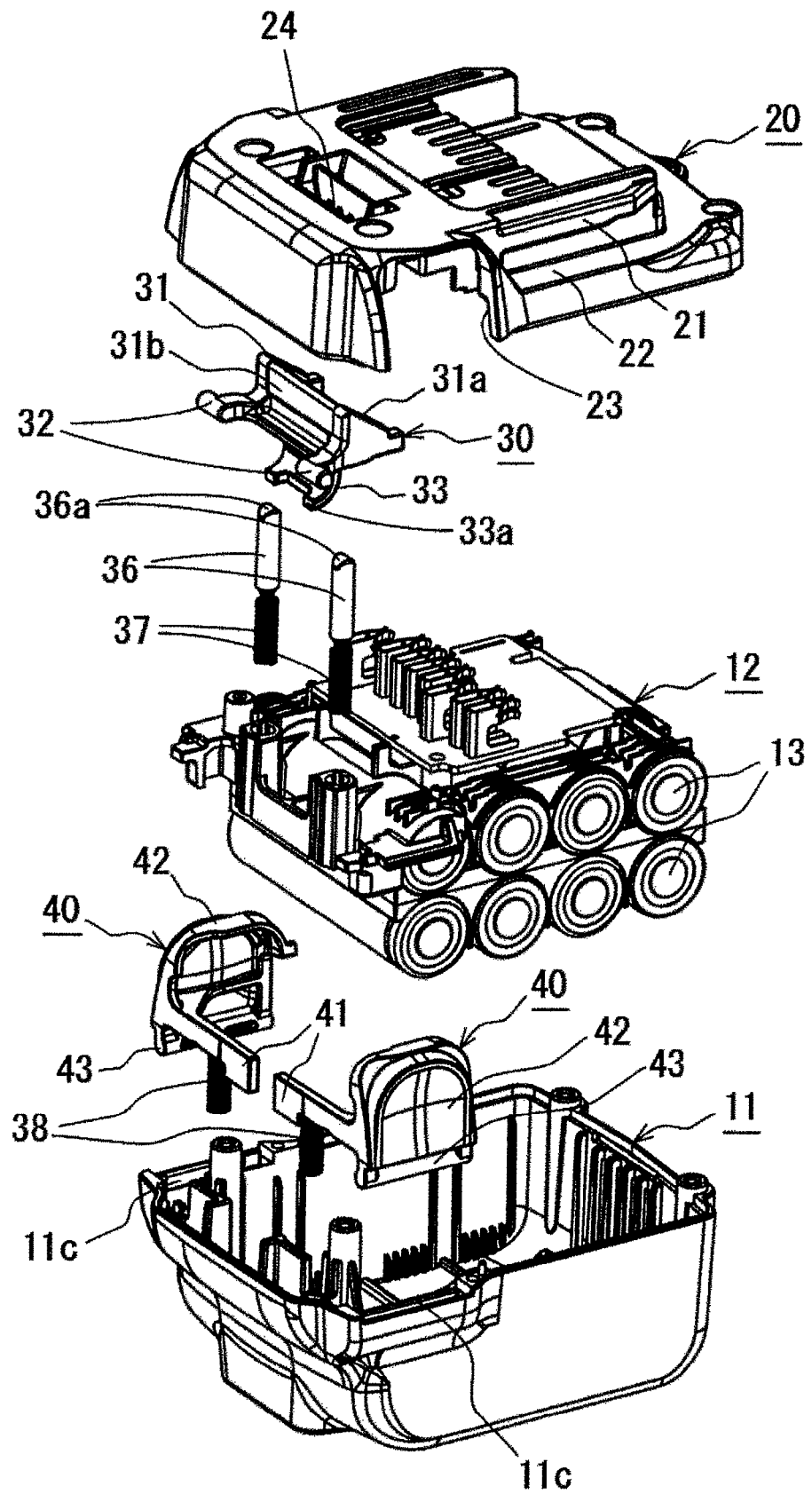
FIG. 4 is an exploded view of the battery pack.
Figure 5:
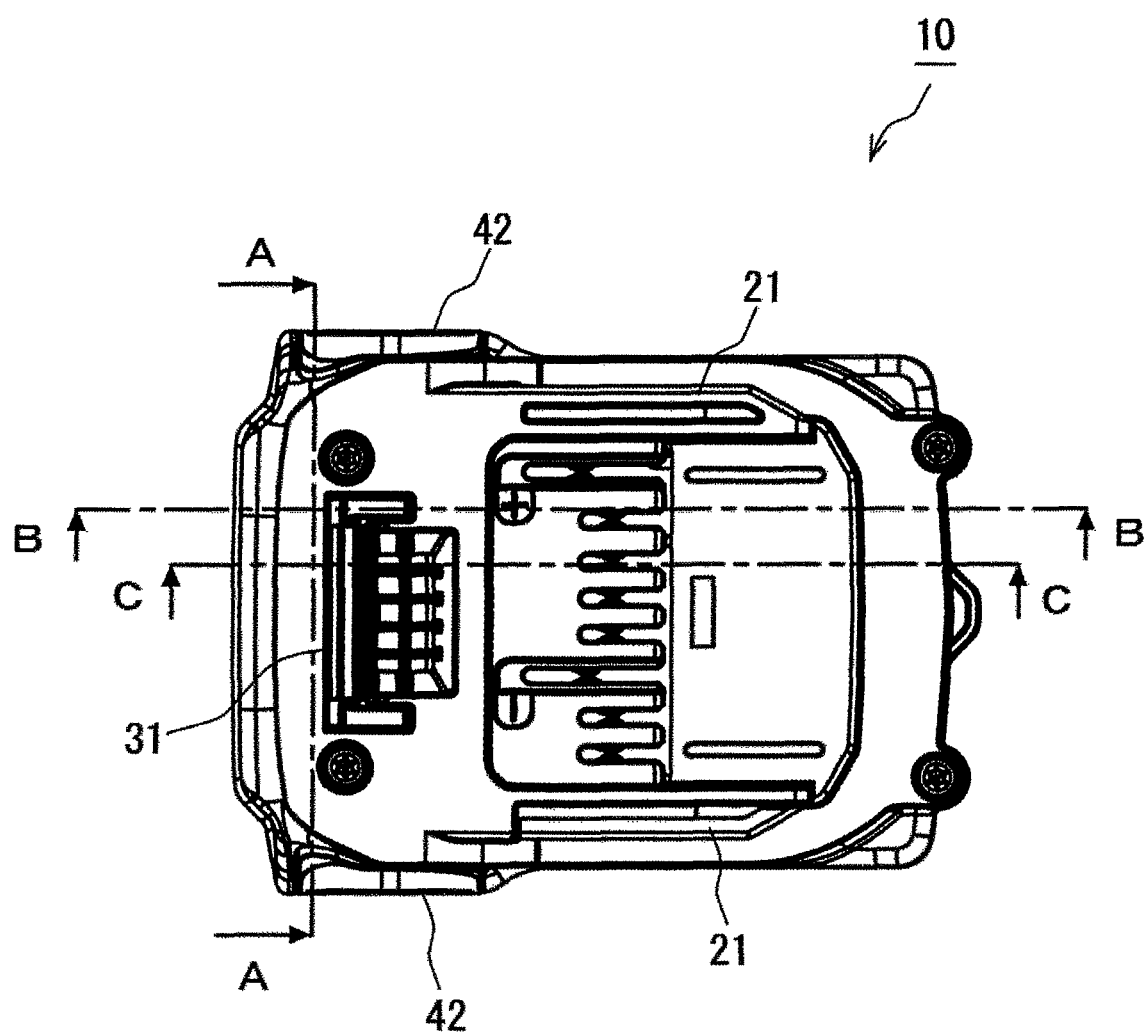
FIG. 5 is a plan view of the battery pack.

FIG. 4 is an exploded view of the battery pack 10. As shown in FIG. 4, the battery pack 10 includes a battery cell 12 having a plurality of batteries 13 connected to each other, a casing body 11 for accommodating the battery cell 12, a cover member 20 for covering the upper portion of the casing body 11, an engaging member 30 having the stopper 31, a lifting member 36 for biasing the engaging member 30, a first spring 37 for applying a biasing force to the lifting member 36, a regulating member 40 for regulating the movement of the engaging member 30, and a second spring 38 for biasing the regulating member 40.

The cover member 20 covers the upper portion of the battery pack 10 and, when screwed to the casing body 11, forms a casing together with the casing body 11 to accommodate other components. As shown in FIG. 4, the guide rails 21 and the grooves 22 are formed on respective side portions of the cover member 20. On the extensions of the terminal end portions of the guide rails 21 and the grooves 21, operation openings 23 are formed to expose the latch operating portions 42 to the outside. The cover member 20 is formed with a latch opening 24 through which the stopper 31 projects.

The engaging member 30 includes the stopper 31 protruding in an angled manner at its upper portion, arms 32 extending on the rear side of the stopper 31, and a downwardly extending portion 33 provided below of the stopper 31. The stopper 31 has an inclined front face and a substantially vertical rear face. The downwardly extending portion 33 is curved rearward as it extends toward its lower end, and includes a protruding end 33a facing a contact portion 41 disposed on the rear side of the downwardly extending portion 33.

The lifting member 36 is a rod-shaped member having an upper distal end 36a formed as a curved face. The distal end 36a of the lifting member 36 contacts the engaging member 30, and is upwardly biased by the first spring 37 provided below the distal end 36a to bias the engaging member 30 upward. Thus, the stopper 31 of the engaging member 30 is biased in a direction in which the stopper 31 projects from the latch opening 24. The lower end of the first spring 37 is supported by a first spring receiving portion 11a of the casing body 11.

The regulating member 40 is configured to regulate the movement of the engaging member 30. The regulating member 40 includes a latch operating portion 42 exposed to the outside from the operation opening 23 so that it can be operated, a contact portion 41 extending inward from the latch operating portion 42, and a support shaft portion 43 disposed below the latch operating portion 42. The support shaft portion 43 is supported by the regulating member receiving portion 11c of the casing body 11 in a rotatable manner. The portion of the regulating member 40 near the contact portion 41 is upwardly biased by the second spring 38 such that the latch operating portion 42 is normally maintained in a substantially vertical orientation. When the latch operating portion 42 is pushed inward from this state, the upper part of the latch operating portion 42 is rotated and tilted inward against the biasing force of the second spring 38 and, at the same time, the contact portion 41 is displaced downward. The lower end of the second spring 38 is supported by a second spring receiving portion 11b of the casing body 11.

The engaging member 30 is supported inside the battery pack 10 in a rotatable and slidable manner.

Figure 6B:
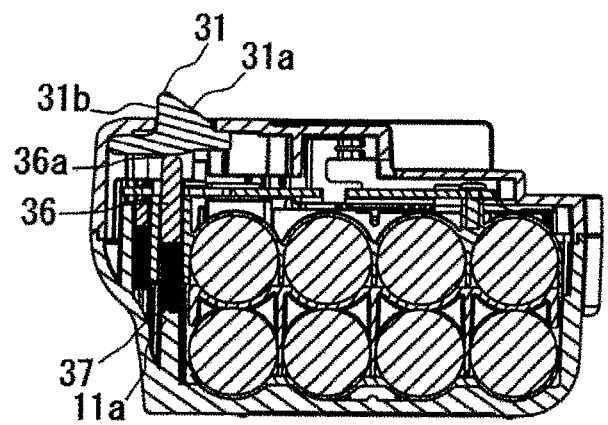
FIG. 6B is a sectional view of the battery pack taken along the line B-B shown in FIG. 5.
Figure 6C:
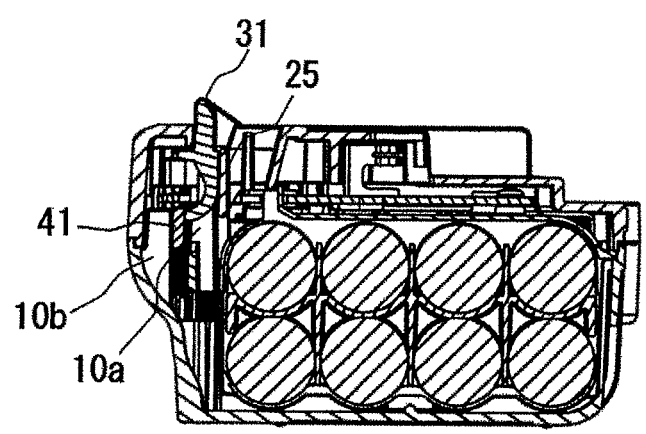
FIG. 6C is a sectional view of the battery pack taken along the line C-C shown in FIG. 5.
Figure 7:
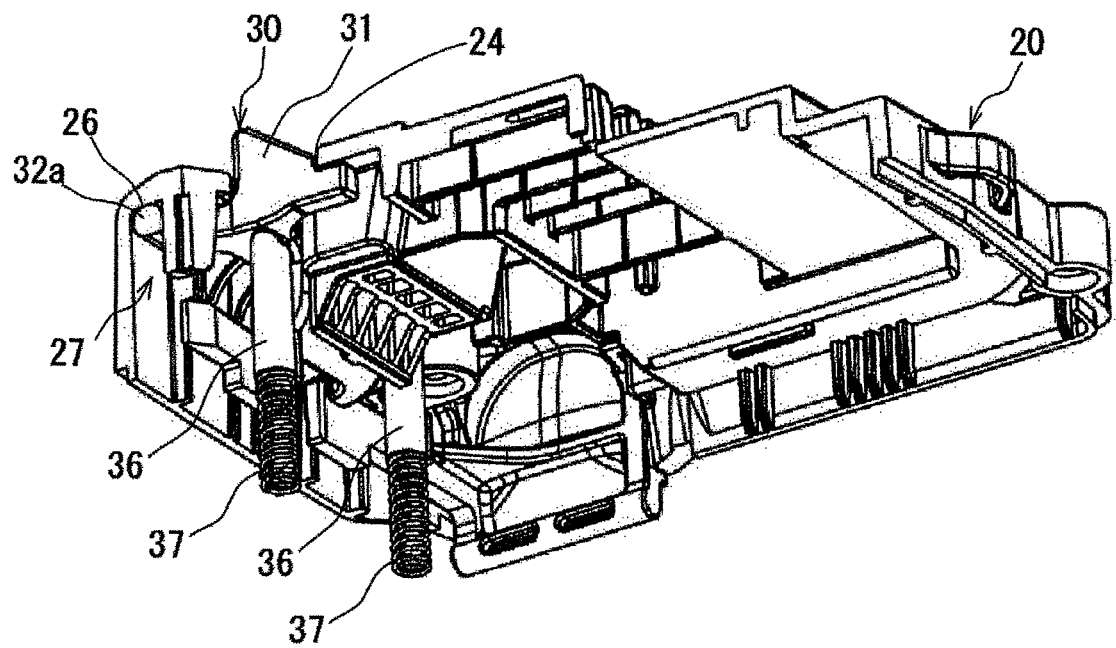
FIG. 7 is a perspective view of the upper portion of the battery pack, illustrating a relationship between a cover member and an engaging member in a normal state.
Figure 8A:
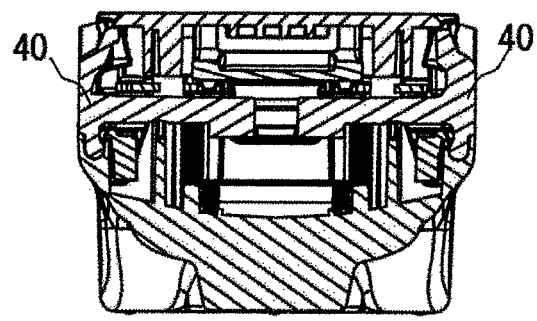
FIG. 8A is a sectional view of the battery pack taken along the line A-A shown in FIG. 5, in which the engaging member is slid.
Figure 8B:
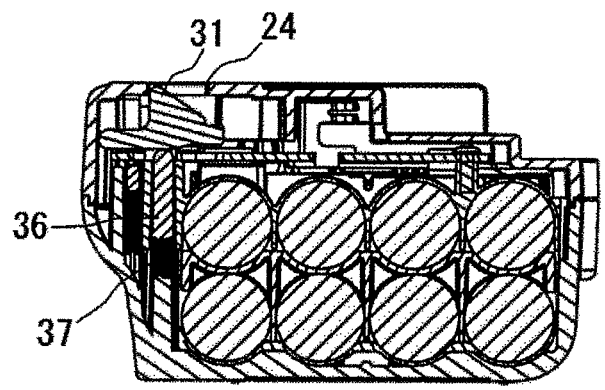
FIG. 8B is a sectional view of the battery pack taken along the line B-B shown in FIG. 5, in which the engaging member is slid.
Figure 8C:
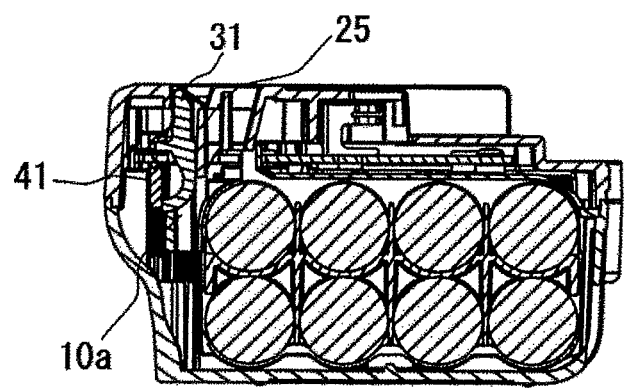
FIG. 8C is a sectional view of the battery pack taken along the line C-C shown in FIG. 5, in which the engaging member is slid.
Figure 9:
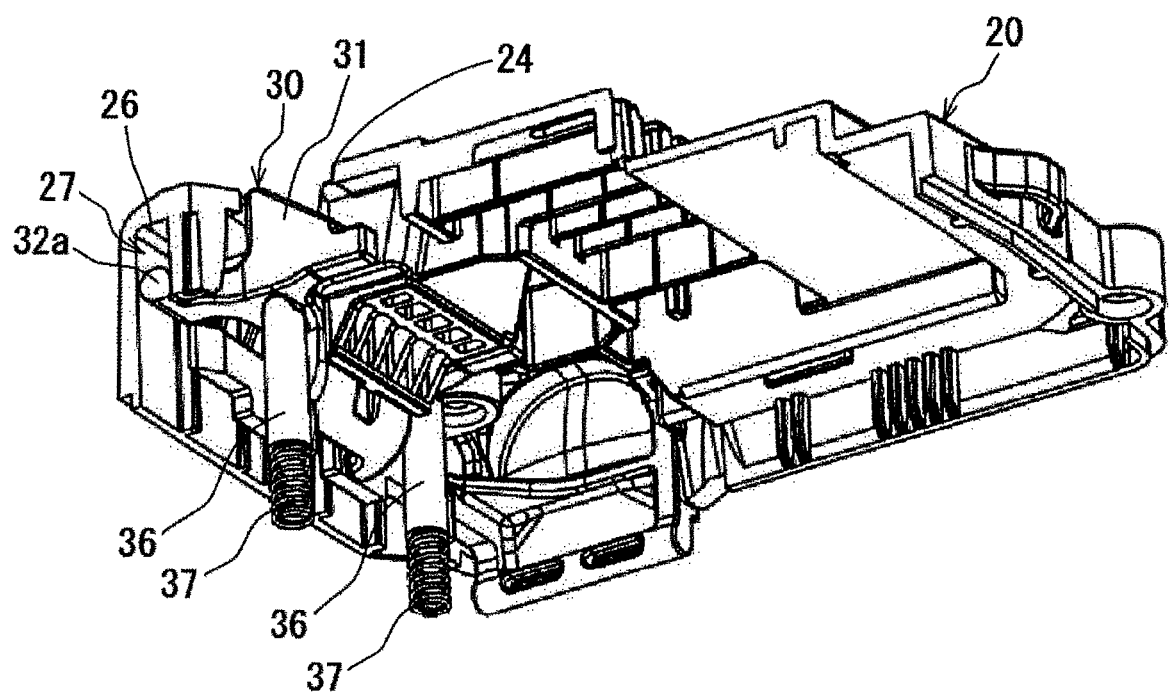
FIG. 9 is a perspective view of the upper portion of the battery pack, illustrating a relationship between the cover member and the engaging member when the engaging member slides.

That is, as shown in FIGS. 6C and 7, the front portion of the engaging member 30 is supported by the support wall 25 of the cover member 20, and the rear portion of the engaging member 30 is supported by the contact portion 41. A sliding space 10a is provided below the engaging member 30 such that the engaging member 30 can linearly slide in the sliding space 10a. That is, as shown in FIGS. 8A to 9, the engaging member 30 can slide up and down in a space between the support wall 25 and the contact portion 41. The engaging member 30 is biased upwardly by the first spring 37 through the lifting member 36 such that the stopper 31 normally engages with the mounting portion 101. As shown in FIGS. 8A to 9, when the engaging member 30 slides against this biasing force, the stopper 31 moves into the latch opening 24 and retracts.

Figure 10A:
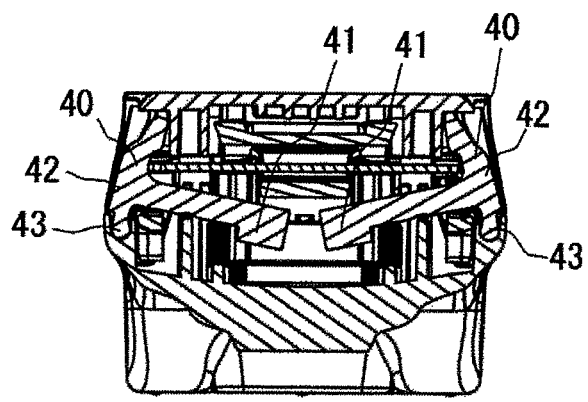
FIG. 10A is a sectional view of the battery pack taken along the line A-A shown in FIG. 5, in which the engaging member is rotated.
Figure 10B:
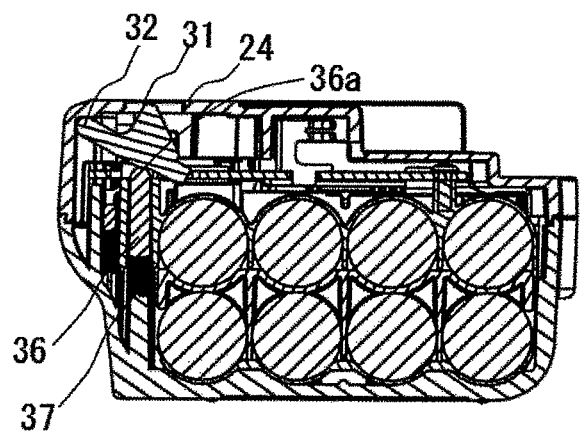
FIG. 10B is a sectional view of the battery pack taken along the line B-B shown in FIG. 5, in which the engaging member is rotated.
Figure 10C:
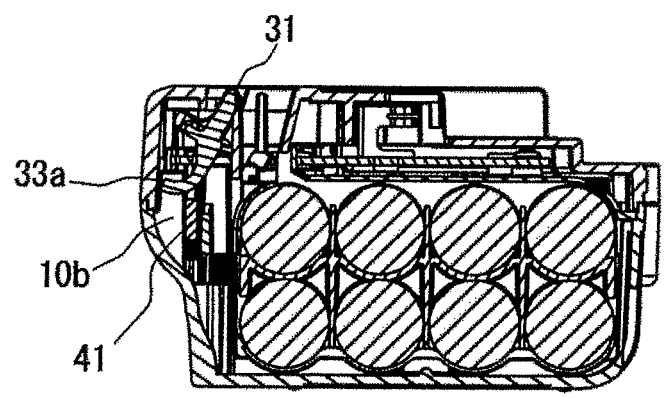
FIG. 10C is a sectional view of the battery pack taken along the line C-C shown in FIG. 5, in which the engaging member is rotated.
Figure 11:
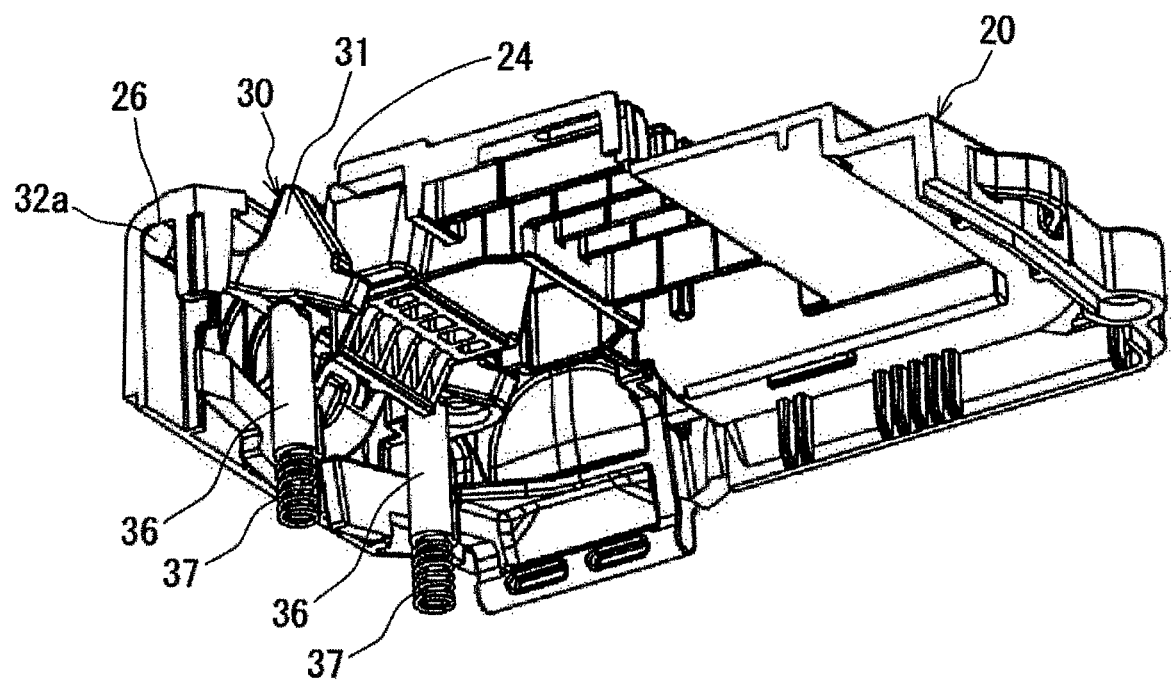
FIG. 11 is a perspective view of the upper portion of the battery pack, illustrating a relationship between the cover member and the engaging member when the engaging member rotated.

As shown in FIG. 6C, the engaging member 30 is arranged such that the contact portion 41 of the regulating member 40 normally faces the protruding end 33a of the downwardly extending portion 33 of the engaging member 30, so that the engaging member 30 is prevented from rotating. When the contact portion 41 is displaced, the engaging member 30 is allowed to rotate. That is, as shown in FIG. 10C, on the rear side of the protruding end 33a of the downwardly extending portion 33 of the engaging member 30, a rotating space 10b is provided to allow the rotation of the engaging member 30. When the latch operating portion 42 is pushed inwardly to displace the contact portion 41, the blocking of the rotation of the engaging member 30 is released. As shown in FIG. 11, the engaging member 30 rotates about the pivot shaft 32a. That is, the pivot shaft 32a of the engaging portion 30 is supported on the engaging member receiving portion 26 of the cover member 20 such that the engaging member 30 rotates with the rear end portion thereof serving as a fulcrum. Accordingly, the stopper 31 retracts by moving down into the latch opening 24. The engaging member 30 rotates while pressing the lifting member 36 slightly downward against the biasing force of the first spring 37. Because the distal end 36a of the lifting member 36 has a curved face, the sliding resistance of the engaging member 30 during its rotation is small, so that the engaging member 30 can rotate smoothly.

Next, attaching of the battery pack 10 to the electric tool 100 will be described.

Figure 12A:
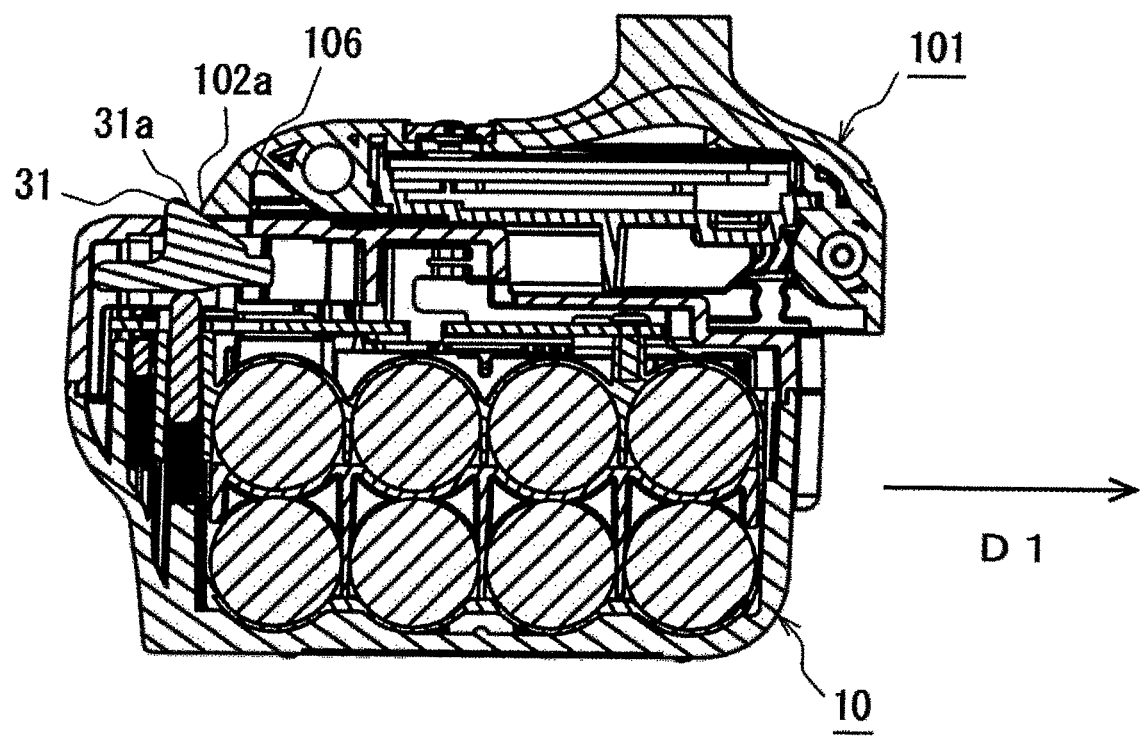
FIG. 12A is a sectional view taken along the line B-B shown in FIG. 5, illustrating a process of attaching the battery pack to the electric tool.
Figure 12B:
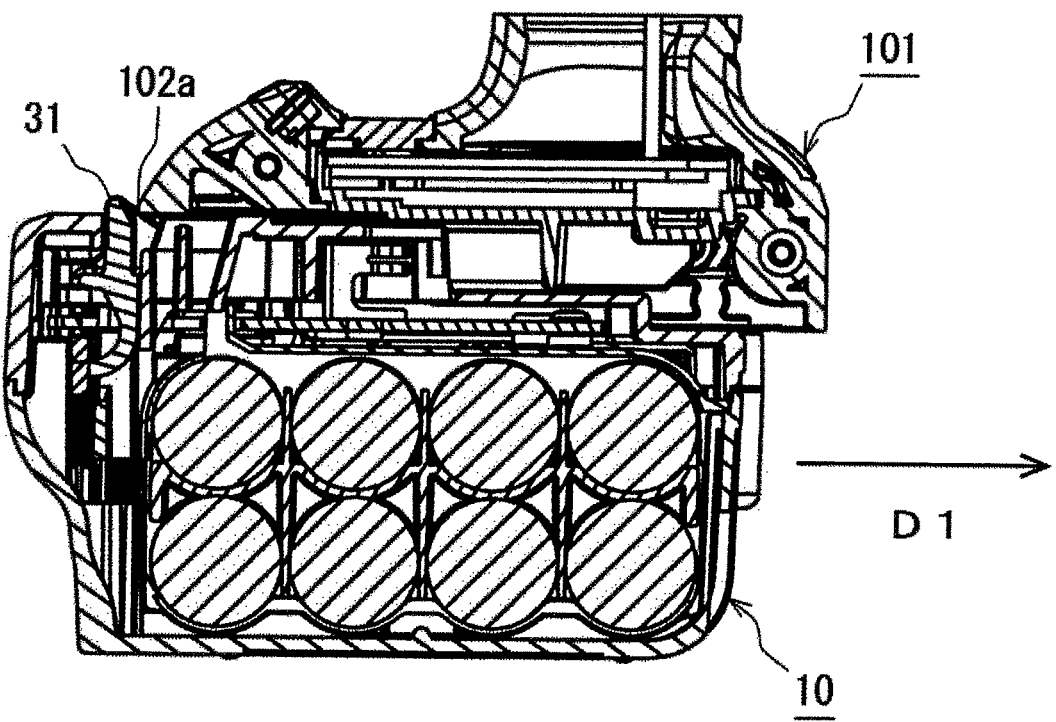
FIG. 12B is a sectional view taken along the line C-C shown in FIG. 5, illustrating the process of attaching the battery pack to the electric tool.

As shown in FIGS. 12A and 12B, when the battery pack 10 slides in the attaching direction D1 relative to the mounting portion 101, the distal side 102a of the mounting portion 101 hits the inclined face 31a of the stopper 31 and presses the inclined face 31a in the sliding direction. A force applied in the sliding direction is converted by the inclined face 31a of the stopper 31 to a force in a downward direction in which the stopper 31 retracts, whereby the stopper 31 is pushed inwardly.

Figure 13A:
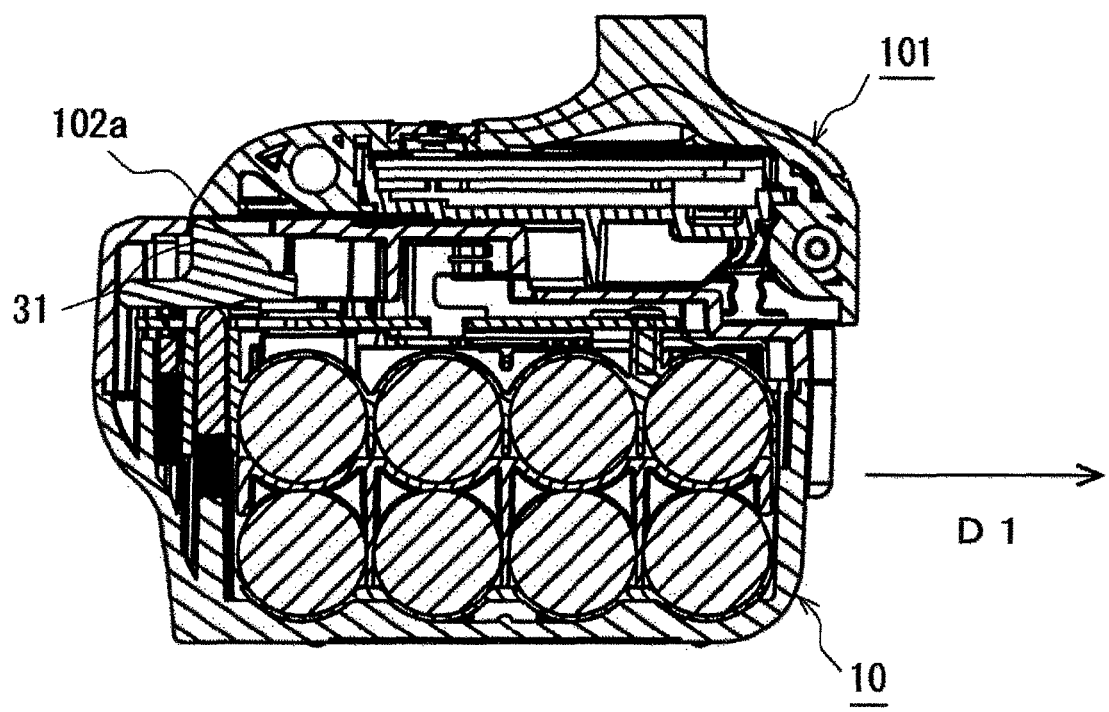
FIG. 13A is a sectional view taken along the line B-B shown in FIG. 5, illustrating a process of attaching the battery pack to the electric tool.
Figure 13B:
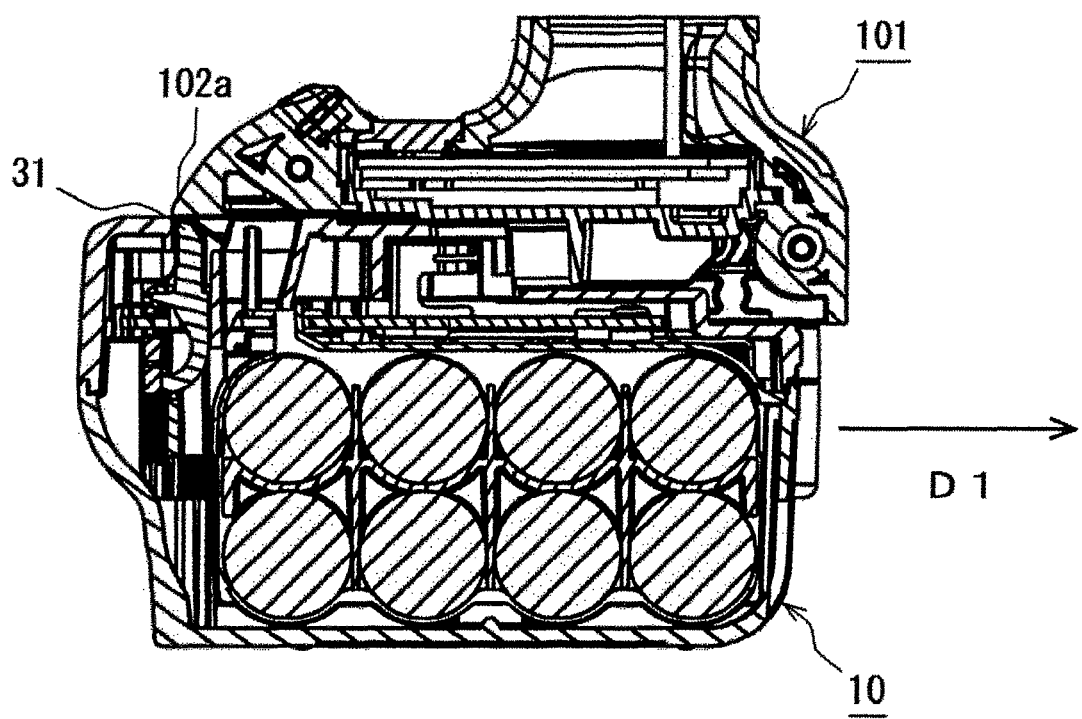
FIG. 13B is a sectional view taken along the line C-C shown in FIG. 5, illustrating the process of attaching the battery pack to the electric tool.

As shown in FIGS. 13A and 13B, when the battery pack 10 further slides in the attaching direction D1, the stopper 31 moves into the latch opening 24 completely so that the stopper 31 is retracted.

Figure 14A:
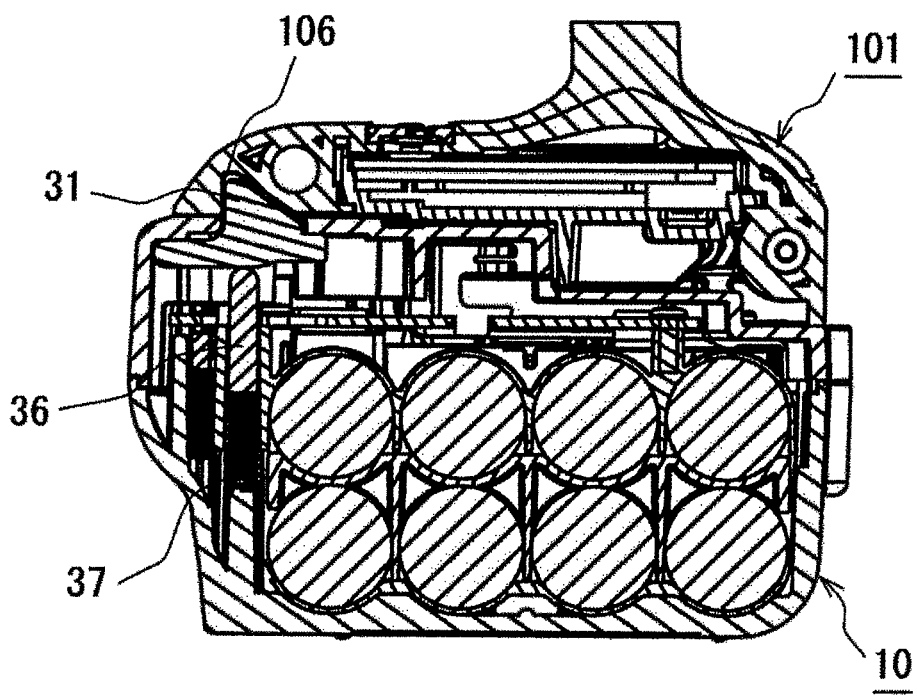
FIG. 14A is a sectional view taken along the line B-B shown in FIG. 5, illustrating a state in which the battery pack is attached to the electric tool.
Figure 14B:
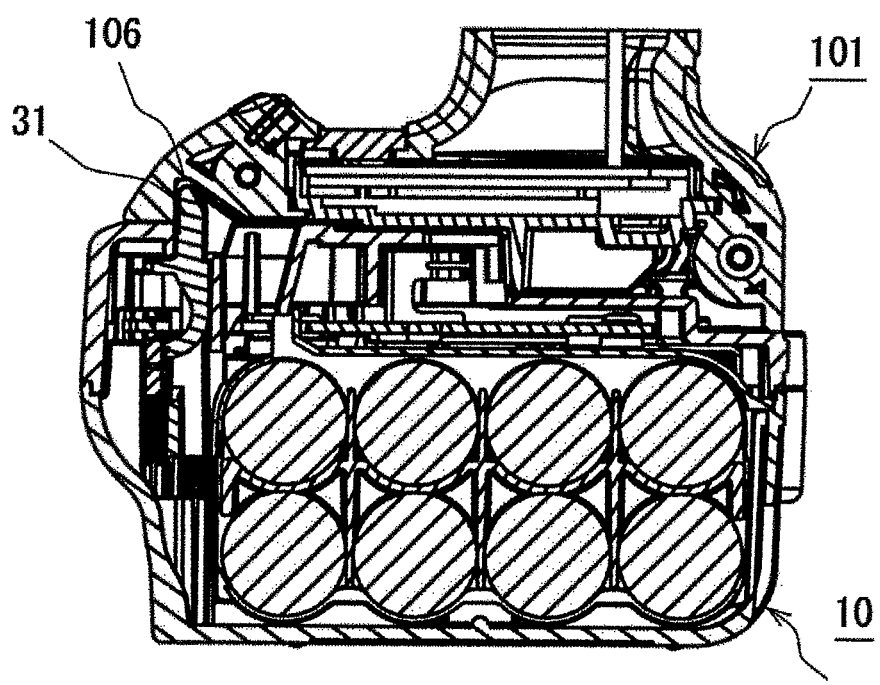
FIG. 14B is a sectional view taken along the line C-C shown in FIG. 5, illustrating a state in which the battery pack is attached to the electric tool.

When the battery pack 10 further slides in the attaching direction D1 until the stopper 31 comes to the position of the engaging portion 106, because the stopper 31 is biased so as to engage with the engaging portion 106 of the mounting portion 101, the stopper 31 is engages with the engaging portion 106 as shown in FIGS. 14A and 14B, whereby the battery pack 10 is completely attached.

Because the rear face of the stopper 31 is substantially vertical, even when a force to slide the battery pack 10 in the detaching direction D2 acts on the battery pack 10, this force is not converted to a force in a direction in which the stopper 31 retracts, i.e., a downward direction force component does not act on the stopper 31. Therefore, in a state in which the rotation of the engaging member 30 is blocked, the stopper 31 cannot be retracted, so that the battery pack 10 cannot be removed from the mounting portion 101.

Next, detaching of the battery pack 10 from the electric tool 100 will be described.

When detaching the battery pack 10 from the electric tool 100, firstly, the latch operating portion 42 is operated to release the blocking of the rotation of the engaging member 30.

Figure 15A:
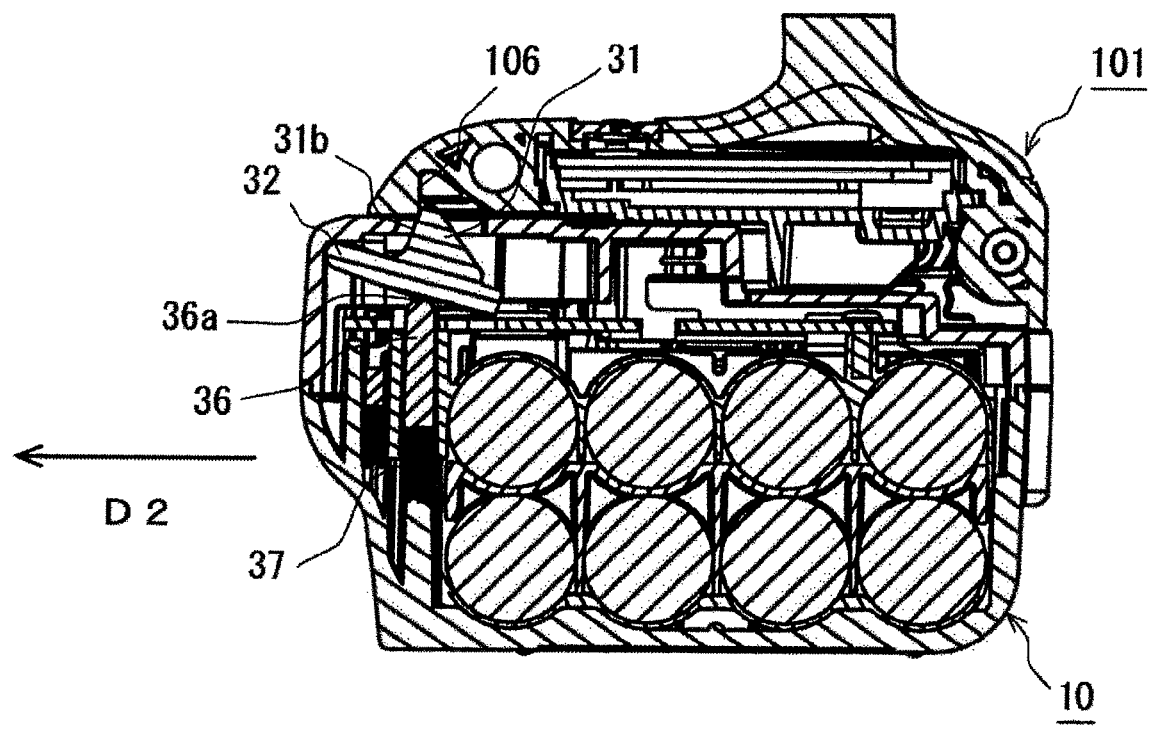
FIG. 15A is a sectional view taken along the line B-B shown in FIG. 5, illustrating a process of detaching the battery pack from the electric tool.
Figure 15B:
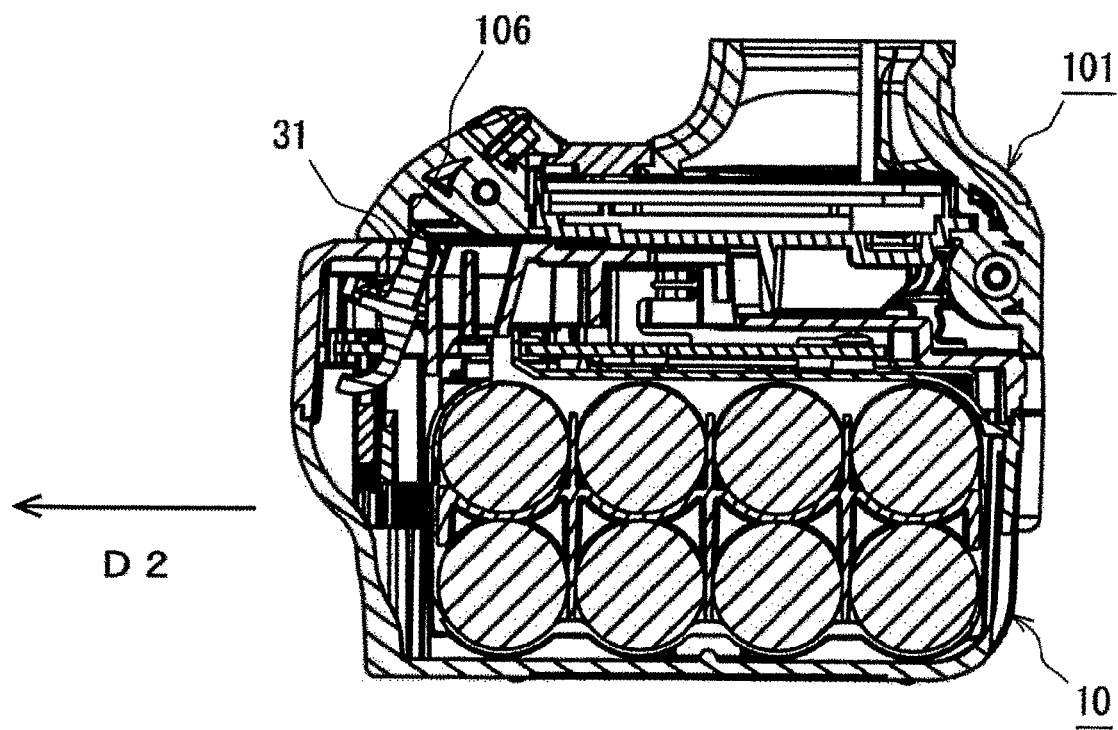
FIG. 15B is a sectional view taken along the line C-C shown in FIG. 5, illustrating a process of detaching the battery pack from the electric tool.

In a state in which the blocking of the rotation of the engaging member 30 is removed, when the battery pack 10 slides in the detaching direction D2, as shown in FIGS. 15A and 15B, the rear portion of the engaging portion 106 of the mounting portion 101 contacts the vertical face 31*b* of the stopper 31 and presses the vertical face 31*b* in the sliding direction. Therefore, the engaging member 30 is rotated and the stopper 31 is pushed inside.

Figure 16A:
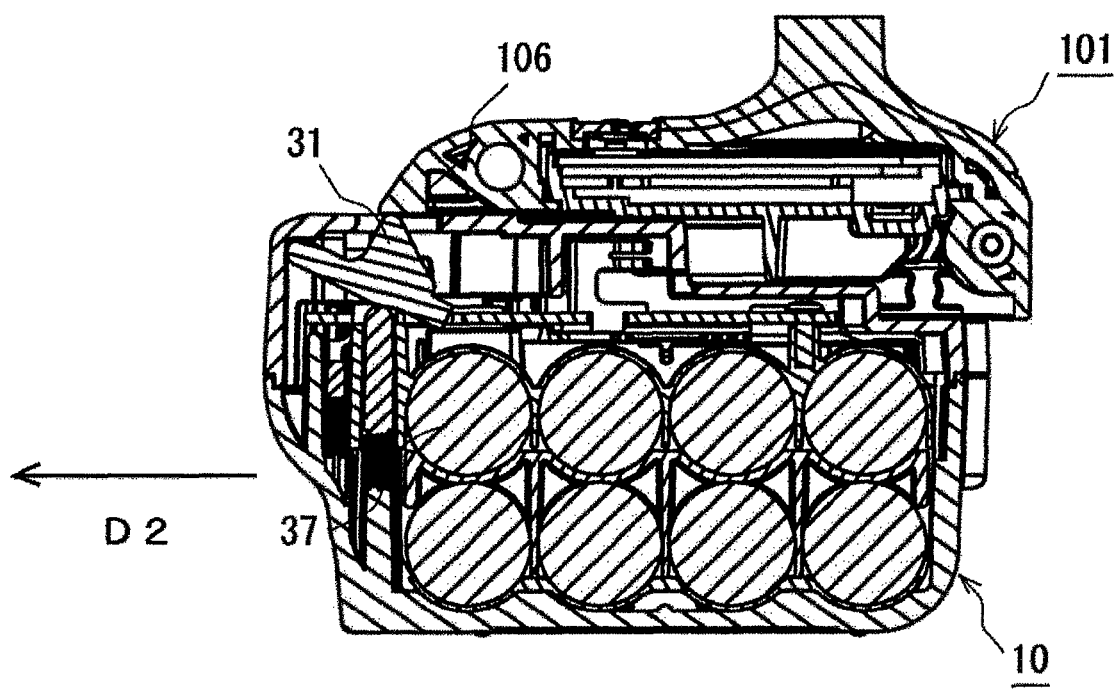
FIG. 16A is a sectional view taken along the line B-B shown in FIG. 5, illustrating a process of detaching the battery pack from the electric tool.
Figure 16B:
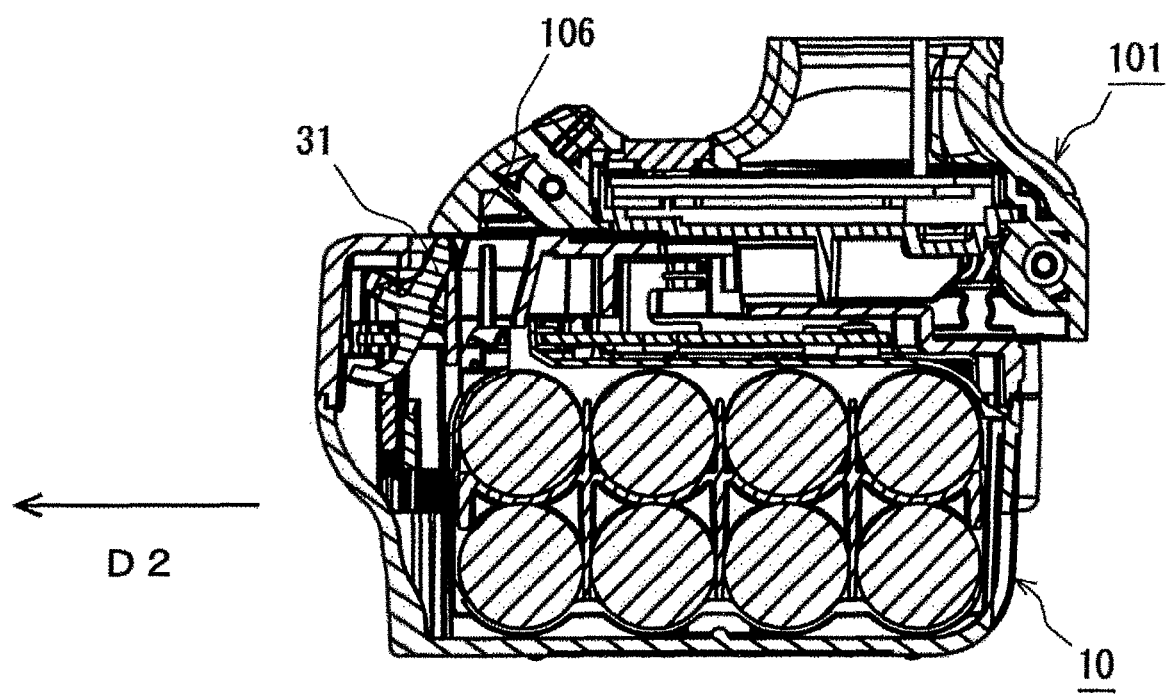
FIG. 16B is a sectional view taken along the line C-C shown in FIG. 5, illustrating the process of detaching the battery pack from the electric tool.

As shown in FIGS. 16A and 16B, when the battery pack 10 further slides in the detaching direction D2, the stopper 31 moves into the latch opening 24 completely so that the stopper 31 is retracted. Therefore, the engagement between the engaging portion 106 and stopper 31 is released, so that the battery pack 10 can be removed from the mounting portion 101. When the battery pack 10 is completely removed, the engaging member 30 returns to its normal position as shown in FIG. 6B due to the biasing force of the first spring 37.

According to the exemplary embodiment described above, the engaging member 30 is supported in a slidable and rotatable manner, and is biased such that the stopper 31 can engage with the mounting portion 101. When the engaging member 30 slides or rotates against such biasing force, the stopper 31 is retracted. The regulating member 40 has the contact portion 41 configured to block the rotation of the engaging member 30 and the latch operating portion 42 operable to displace the contact portion 41 to release the blocking of the rotation of the engaging member 30. When the battery pack 10 slides in the attaching direction D1, the engaging member 30 is pressed by the mounting portion 101 such that the engaging member 30 slides and the stopper 31 retracts. In a state in which the latch operating portion 42 is operated so that the blocking of the rotation of the engaging member 30 is released, when the battery pack 10 slides in the detaching direction D2, the engaging member 30 is pressed by the mounting portion 101 such that the engaging member 30 rotates and the stopper 31 retracts.

That is, when detaching the battery pack 10, the stopper 31 is retracted, not by operating the latch operating portion 42, but by sliding the mounting portion 101 relative to the battery pack 10. The latch operating portion 42 is operated merely to bring the stopper 31 in a retractable state.

Therefore it is not necessary to provide a sliding face inside of the battery pack 10 to move the engaging member 30. Accordingly, it is possible to avoid the problem that the sliding face roughened, which may cause an increase in frictional resistance and deterioration of operability.

Also, because the engagement of the battery pack 10 cannot be released only by operating the latch operating portion 42, even when the latch operating portion 42 is operated by error, the battery pack 10 will not drop off. Thus, the safety in handling the battery pack 10 is improved.

Further, the first spring 37 that defines the biasing force applied to the engaging member 30 and the second spring 38 that defines the biasing force applied to the regulating member 40 are separately provided. Accordingly, a load for the engagement and a load for the operation can be selected separately and appropriately.

Figure 17:
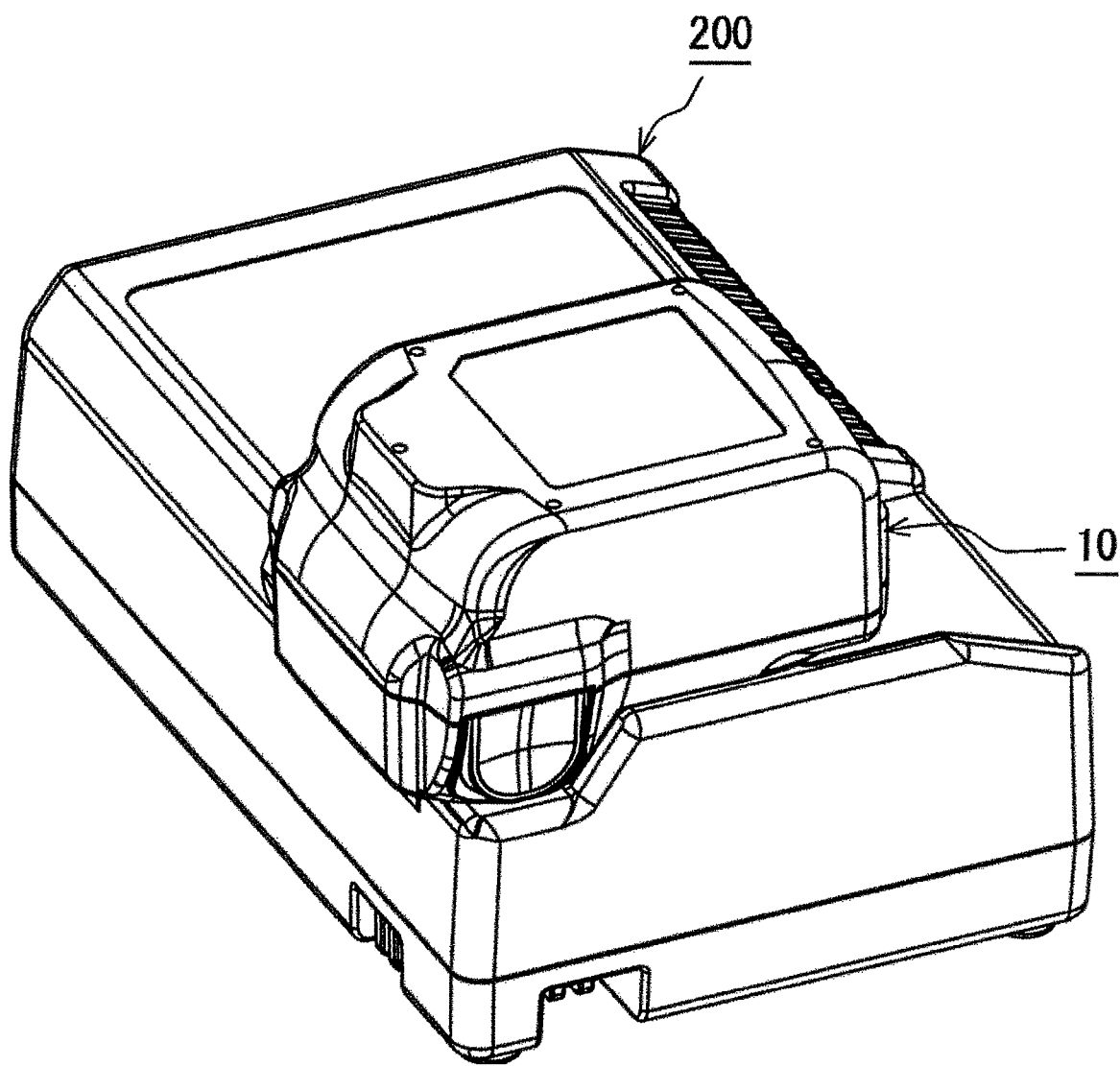
FIG. 17 is a perspective view of a battery charger on which the battery pack mounted.

The present invention is not limited to the exemplary embodiment described above. For example, the battery pack 10 may be configured such that it can be mounted to electric tools other than an electric rotary tool (e.g., an electric circular saw or an electric scissors). Also, as shown in FIG. 17, the battery pack 10 may be configured such that it can be mounted to a battery charger 200. In this case, the mounting portion of the battery charger 200 is configured is a similar manner as the mounting portion 101 of the electric tool 100.

The stopper 31 may provided to project from the grooves 22 on respective sides of the cover member 20, and the engaging portion 106 may be formed in the slide groove 105 of the mounting portion 101 accordingly such that the stopper 31 and the engaging portion 106 engage with each other. In this example as well, the latch operating portion 42 is configured to bring the stopper 31 in a retractable state.

In the above exemplary embodiment, the regulating members 40 are provided on both sides of the battery pack 10. However, the regulating member 40 may arranged at other positions. For example, the regulating member 40 may be disposed in the rear portion of the battery pack 10.

In the exemplary embodiment described above, the blocking of the rotation of the engaging member 30 is removed by inwardly pushing the regulating member 40. However, alternatively, the regulating member 40 may be configured such that the contact portion 41 is displaced by vertically sliding the regulating member 40 or by turning the regulating member 40, thereby releasing the blocking of the rotation of the engaging member 30.

What is claimed is:

1. A battery pack comprising:
   a casing having an opening;
   an engaging member having a stopper; and
   a regulating member configured to regulate a movement of the engaging member,
   wherein the engaging member is supported in a slidable and rotatable manner relative to the casing, and is applied with a biasing force such that the stopper projects from the opening,
   the regulating member comprises a contact portion configured to block a rotation of the engaging member and an operating portion configured to displace the contact portion to release a blocking of the rotation of the engaging member,
   when the operating portion is in a non-operated state, the engaging member is slidable against the biasing force to retract the stopper, and
   when the operating portion is in an operated state, the engaging member is rotatable against the biasing force to retract the stopper.

2. The battery pack according to claim 1, wherein the operating portion is provided in a pair on respective sides of the battery pack in an opposed manner.

3. The battery pack according to claim 1, wherein the regulating member is configured such that, when the operating portion is pushed in toward an inside of the casing, the blocking of the rotation of the engaging member is released.

4. The battery pack according to claim 1, further comprising a lifting member having a distal end that contacts the engaging member to bias the engaging member, wherein the distal end of the lifting member has a curved face.

5. An electric tool configured such that a battery pack is detachably attached, the battery pack comprising a casing having an opening, an engaging member having a stopper, and a regulating member configured to regulate a movement of the engaging member, wherein the engaging member is supported in a slidable and rotatable manner relative to the casing, and is applied with a biasing force such that the stopper projects from the opening, the regulating member comprises a contact portion configured to block a rotation of the engaging member and an operating portion configured to displace the contact portion to release a blocking of the rotation of the engaging member, wherein when the operating portion is in a non-operated state, the engaging member is slidable against the biasing force to retract the stopper, and when the operating portion is in an operated state, the engaging member is rotatable against the biasing force to retract the stopper, the electric tool comprising:
- a mounting portion to which the battery pack is attached in a slidable manner,
- wherein the mounting portion comprises an engaging portion with which the stopper engages when the battery pack is attached to the mounting portion,
- the mounting portion is configured such that, when the battery pack slides in an attaching direction relative to the mounting portion, the mounting portion presses the stopper to slide the engaging member and to retract the stopper, and
- the engaging portion is configured such that, when the operating portion is operated and the battery pack slides in a detaching direction relative to the mounting portion, the engaging portion presses the stopper to rotate the engaging member and to retract the stopper.

6. A battery charger configured such that a battery pack is detachably attached, the battery pack comprising a casing having an opening, an engaging member having a stopper, and a regulating member configured to regulate a movement of the engaging member, wherein the engaging member is supported in a slidable and rotatable manner relative to the casing, and is applied with a biasing force such that the stopper projects from the opening, the regulating member comprises a contact portion configured to block a rotation of the engaging member and an operating portion configured to displace the contact portion to release a blocking of the rotation of the engaging member, wherein when the operating portion is in a non-operated state, the engaging member is slidable against the biasing force to retract the stopper, and when the operating portion is in an operated state, the engaging member is rotatable against the biasing force to retract the stopper, the battery charger comprising:
- a mounting portion to which the battery pack is attached in a slidable manner,
- wherein the mounting portion comprises an engaging portion with which the stopper engages when the battery pack is attached to the mounting portion,
- the mounting portion is configured such that, when the battery pack slides in an attaching direction relative to the mounting portion, the mounting portion presses the stopper to slide the engaging member and to retract the stopper, and
- the engaging portion is configured such that, when the operating portion is operated and the battery pack slides in a detaching direction relative to the mounting portion, the engaging portion presses the stopper to rotate the engaging member and to retract the stopper.

* * * * *